United States Patent [19]

Craven

[11] 3,765,924

[45] Oct. 16, 1973

[54] FINISHING PROCESS AND COMPOSITION

[75] Inventor: James M. Craven, Wilmington, Del.

[73] Assignee: E. I. du Pont de Nemours and Company, Wilmington, Del.

[22] Filed: June 29, 1971

[21] Appl. No.: 158,092

Related U.S. Application Data

[63] Continuation-in-part of Ser. No. 14,632, Feb. 26, 1970, abandoned.

[52] U.S. Cl.............. 117/63, 117/64 R, 117/72, 117/75, 117/76 R, 117/76 P, 117/76 T, 117/132 R, 117/138.8 R, 117/142, 117/143 R, 117/148, 117/155 R, 260/29.1, 260/31.2, 260/31.8, 260/33.2, 260/33.4, 260/33.6, 260/34.2

[51] Int. Cl............... B44d 1/44, P09d 3/80

[58] Field of Search .......... 117/64 R, 148, 161 UC, 117/161 UT, 161 UF, 63, 72, 75, 76 R, 76 T, 132 R, 138.8 R, 142, 143 R, 148, 155 R, 76 P; 260/29.1, 31.2, 31.8, 33.2, 33.4, 33.6, 34.2

[56] References Cited
UNITED STATES PATENTS

| | | | |
|---|---|---|---|
| 2,582,354 | 1/1952 | Powell et al. | 260/32.8 |
| 3,549,398 | 12/1970 | Watson | 117/64 R |
| 3,397,166 | 8/1968 | Schmidle et al. | 260/33.6 UA |
| 3,450,652 | 6/1969 | Lin | 117/148 |
| 3,331,801 | 7/1967 | Osmond | 260/31.2 |
| 3,647,516 | 3/1972 | Edwards | 117/148 |
| 3,446,769 | 5/1969 | Opipari | 260/33.6 UA |
| 3,304,279 | 2/1967 | Nielson | 260/31.4 |
| 3,451,978 | 6/1969 | Chalmers et al. | 117/148 |
| 3,222,208 | 12/1965 | Bertollo | 117/63 |

Primary Examiner—William D. Martin
Assistant Examiner—William R. Trenor
Attorney—Robert W. Black

[57] ABSTRACT

A dispersion, suitable for finishing substrates such as wood, metal, leather, paper, fabrics, plastics and the like, having a continuous liquid phase and a dispersed polymer phase which undergoes only partial coalescence on drying under ambient conditions thereby being easy to work (sand). On being subjected to coalescing means substantially complete coalescence can thereafter be obtained.

6 Claims, No Drawings

FINISHING PROCESS AND COMPOSITION

This application is a continuation-in-part of the copending application Ser. No. 14632, filed Feb. 26, 1970, now abandoned.

This invention relates to a process and composition for finishing furniture and other articles with a finish comprising one or more polymeric coating layers.

This invention is a dispersion consisting essentially of a dispersed continuous liquid phase comprising an organic liquid free of halogen substitution and a dispersed phase comprising particles of a linear polymer which polymer has a Tg between about 10° C. and 70° C. is amorphous and has at least 50 percent by weight acrylic monomer units, said polymer being soluble in common solvents, said disperse phase being substantially insoluble in said liquid phase at 25° C., said dispersion forming a layer having between 20–60 percent coalescence when applied and dried by evaporation of volatile components at about 25° C.

Preferably the polymer has a Tg between about 25° C. and 70° C. and most preferably between 40° C. and 70° C.

The polymer present in the disperse phase is preferably at least one member of the group consisting of poly(alkyl acrylates), poly(alkyl methacrylates), interpolymers of an alkyl acrylate and an alkyl methacrylate, and interpolymers of about 50–99.9 percent by weight of units of an alkyl acrylate or an alkyl methacrylate and about 0.1–50 percent by weight of units of another ethylenically unsaturated compound selected from the group consisting of poly(vinyl acetate), polystyrene, poly(vinyl chloride), poly(vinylidene chloride).

The composition may also contain a pigment.

The polymeric dispersed phase may consist essentially of particles having a major cross-sectional dimension of between about 0.01 and 25 microns and most preferably the major cross-sectional dimension is between about 0.05 and 1 micron.

In one embodiment the continuous liquid phase consists essentially of a mixture of an organic liquid which is a non-solvent for the polymer at a temperature below 39° C. and an organic liquid which is a solvent for the polymer at a temperature below 39° C., at least part of the former having a slower evaporation rate than at least part of the latter. Preferably the weight ratio of nonsolvent to solvent is about 50:50 to 99:1.

Typically the liquid comprising the disperse phase is an aliphatic hydrocarbon and the weight ratio of polymer to continuous phase is between about 20:80 to 70:30, preferably between about 30:70 to 40:60.

This invention also comprises a process of applying to a surface of a substrate the above dispersion and forming therefrom a layer of the dispersed phase having between about 20 to 60 percent coalescence, rubbing the layer with an abrasive to modify its smoothness, and subjecting the resulting abraded layer to coalescing means to form a substantially completely coalesced layer.

The coalescing means typically comprising contacting said layer with a solvent and subsequently evaporating said solvent.

The disperse phase is usually made of a polymer having a Tg of at least 10° C.; and in some applications a polymer having a Tg of at least 40° C. is preferred. "Tg" refers to the "glass transition temperature."

The polymers of the claimed range have a Tg between such limits as to effect a balance between ease of coalescence by practical commonly used means (in application) and mar resistance under prolonged heavy load (of a surface in use). Raising Tg tends to result in increased difficulty in coalescence. Lower Tg tends to decrease resistance to flow under heavy load. The Tg range of the polymers in the dispersion of the claimed invention, results in satisfactory resistance to flow of a surface in a finished article. Preferred ranges of Tg provide even better use properties of the polymer in the finished article.

Similarly, the amorphous nature of the polymer helps provide for coalescence. This property together with solubility of the polymer in common solvents tends to provide for coalescence by means not harmful to the substrate to which this finish is applied.

Percent coalescence of a layer is measured by the abrasion resistance of a layer compared to the abrasion resistance of a completely coalesced layer of the same material determined as described hereinafter.

The dispersion of the present invention forms a partially coalesced layer between about 20 and 60 percent coalescence. It has been found desirable in some applications to form such a layer, undesirable in the final product, because of the ease of working (sanding) such a layer. Further coalescence of this intermediate product provides a substantially completely coalesced layer.

The partially coalesced layer is suitable for working when the volatile solvent has evaporated and the presence of the partially coalesced film can be ascertained at that time. Because conditions of the industry are such that work is accomplished at ambient conditions the dispersion of the invention must form a partially coalesced film (layer) at 25° C. and ambient environment. Film formation is rather rapid. However, for purposes of uniformity the conditions of the claimed invention are considered met if at 24 hours after application of the dispersion at 25° C. and under environmental conditions the layer formed has the required degree of coalescence.

Without being bound thereby, it is thought that a coalesced layer formed from an organosol is the result of a gradual progression from the deposition of discrete particles through a stage wherein the particles contact (with the presence of voids) but retain their particle identity-to the final stage wherein no particle indentity is observed and voids in the layer are substantially eliminated. The present invention provides a dry partially coalesced film or layer on the surface of a substrate. This dry coalesced layer is readily worked.

DEGREE OF COALESCENCE

Degree of coalescence is measured by the abrasion resistance of a given layer of polymer (film) in cycles/mil (as described hereinafter) as compared to the abrasion resistance of a completely coalesced film. This method can also be used to formulate dispersions which will yield the desired degree of coalescence on application to a substrate. Such a procedure is described in Example 1 with the description of the test method.

For ease of coalescence, polymer should dissolve at room temperature in at least one of the following common solvents or a mixture thereof. Aromatic hydrocarbon, b.p. <150° C., such as toluene, xylene; $C_1$-$C_{10}$ aliphatic or alicyclic primary, secondary or tertiary alcohol, such as methanol, ethanol, isopropanol, butanol, amyl alcohol, methyl isobutyl carbinol, cyclohexanol, t-butyl alcohol, 2-ethyl-hexanol; $C_3$-$C_{10}$ aliphatic or alicyclic ketone, such as acetone, diisobutyl ketone, methyl ethyl ketone, ethyl amyl ketone, isophorone, methyl isobutyl ketone, methyl isobutyl ketone, diethyl ketone, mesityl oxide, cyclohexanone, diacetone alcohol; esters of $C_1$-$C_4$ aliphatic acid with a $C_1$-$C_6$ aliphatic alcohol, such as ethyl acetate, isopropyl acetate, methyl acetate, n-butyl acetate, sec-butyl acetate, isobutyl acetate, n-propyl acetate, amyl acetate, butyl lactate ethyl lactate, isobutyl isobutyrate, $\alpha$-methyl isoamyl acetate; $C_2$-$C_{10}$ polyether, such as mesityl oxide, butoxyethyl alcohol, butoxyethyl acetate, monobutyl ether of diethylene glycol, monoethyl ether of diethylene glycol, ethoxyethyl alcohol, ethoxyethyl acetate, monoethyl ether of triethylene glycol, metoxyethanol, monomethyl ether of diethylene glycol.

To test for solubility, mix 0.03 g. of polymer powder 1 ml solvent in a test tube and insert a stopper. Gentle shaking should be sufficient to dissolve at least 95 percent of the polymer in less than 24 hours. If all the polymer dissolves to give a clear or slightly hazy solution, it is considered soluble. If a trace of insoluble powder remains undissolved, the polymer is still considered soluble. If the polymer remains visible — whether swollen, broken up, emulsified or unaffected, it is considered insoluble even though some may have dissolved.

DESCRIPTION OF THE PREFERRED EMBODIMENTS

The continuous liquid phase may comprise a mixture of an organic liquid which is a non-solvent for the polymer at a temperature below 39° C. hereinafter called non-solvent and an organic liquid which is a solvent for the polymer at a temperature below 39° C. hereinafter called solvent, at least part of the nonsolvent having a slower evaporation rate than at least part of the solvent. This provides a preferred means for obtaining a predetermined degree of partial coalescence. It is often preferred that about 50-100 percent by weight of solvent have a slower evaporation rate than about 50-100 percent by weight of non-solvent. Some of the most useful embodiments of the composition employ an aliphatic hydrocarbon as the non-solvent (e.g. one or more members of the group consisting of naphtha, kerosene, hexane, mineral spirits and the like), with solvent being another kind of volatile organic liquid (e.g. one or more members of the group consisting of aromatic hydrocarbons, ketones, esters, ethers, alkanols and the like).

If there is any undue increase in viscosity or tackiness of a particular composition before or during its application to a substrate, or if the coating undergoes too much coalescence during drying so that it is not readily worked this indicates that the polymer component is not sufficiently insoluble in the continuous phase. Example 1 teaches how to prepare compositions of the present invention from compositions outside the scope. They may be brought within the scope by some of the techniques recited below.

(1) increase the ratio of non-solvent to solvent;
(2) replace some solvent with more volatile solvent;
(3) replace some solvent with a less volatile non-solvent.

The weight ratio of non-solvent component to solvent component in most cases is preferably about 50:50 to 99:1; especially preferred is a ratio of about 75:25 to 95:5 of nonsolvent/solvent.

The liquid phase is "volatile" in the sense that it can be evaporated under conditions which are not harmful to any component of the coated article.

Elevated temperatures are not considered satisfactory for wood for long exposures and therefore coalescence of polymer coatings for wood, on wood are best carried out by a "solvent treatment" at room temperature or slightly elevated temperature. Polymers such as polyvinyl chloride which require for purposes of this invention excessive heat to coalesce are not considered suitable.

The dispersion can also comprise a dispersion stabilizer adapted to render the composition resistant to agglomeration and settling. Any non-volatile components that settle out during prolonged storage of the composition (e.g. several months or more) can usually be redispersed by a brief period of agitation. The stabilizer content is usually about 1–20 parts, preferably about 4–8 parts, per 100 parts by weight of polymer component. One useful stabilizer is the product of reacting poly(12-hydroxy stearic acid) with certain acrylic compounds. The graft copolymers described by Armour, et al. in the claims of Swiss Pat. No. 464,528, granted Oct. 31, 1968, illustrate another useful type of dispersion stabilizer. In one embodiment of the present invention the above described graft copolymer comprises all or part of the polymer dispersed phase.

An especially useful type of polymer to use for component the dispersed phase is an acrylic polymer such as a poly(alkyl acrylate), a poly(alkyl methacrylate), an interpolymer of at least one alkyl acrylate and at least one alkyl methacrylate, an interpolymer of about 50-99.9 percent by weight of units of an alkyl acrylate or an alkyl methacrylate and about 0.1-50 percent by weight of units of another ethylenically unsaturated compound copolymerized therewith, or a blend of two or more such polymers. Among the preferred compounds copolymerized therewith are acrylic acid, methacrylic acid, acrylonitrile, methacrylonitrile and vinyl acetate.

Other polymerizable components include vinyl chloride and vinylidene chloride.

Some polymers which would be useful are
60/40 MMA/MA
55/40/5 MMA/MA/DMAM
70/30 MMA/EA
80/20 MMA/BA
60/40 MMA/2EHA
75/25 EMA/MA
90/10 EMA/EA
50/50 MMA/BMA
60/39/1 MMA/MA/MAA wherein
MMA = Methyl methacrylate
MA = Methyl Acrylate
EA = Ethyl acrylate
EMA = Ethyl methacrylate
BA = Butyl acrylate
2EHA = 2-Ethylhexyl acrylate
BMA = Butyl methacrylate
DMAM = Dimethylaminoethyl methacrylate
MAA = Methacrylic acid The composition can contain a dispersed pigment in an amount sufficient to provide the desired color and other properties; for example, the weight ratio of the polymer component to pigment can be within the range of about 1:99 to 99:1. When the composition is to be used as a color composition, for example, a base coat, the polymer:pigment weight ratio is usually about 1:99 to 40:60, preferably about 5:95 to 35:65.

Among the useful pigments are burnt umber, raw umber, VanDyke Brown, burnt sienna, raw sienna, mineral black, lithol red; titanium dioxide, ferrite yellow-orange, zinc oxide, zinc sulfide, lead titanate, antimony oxide, zirconium oxide, white lead, basic lead silicate, lithopone, carbon black, other iron oxides of various colors, lead chromate and molybdate orange; also the pigments sometimes referred to as pigment extenders, for example, calcium carbonate, talc, barytes, diatomaceous earth, asbestine, china clay, silica and fine mica; also various known nitroso-, nitro-, azo- and pyrazolone pigments as well as basic dye-, auxanthine dye-, anthraquinone-, phthalo-, cyanine-, and vat color pigments.

The composition can contain a small amount of material such as polymer in addition to the polymer comprising the dispersed phase if it does not prevent obtaining the desired coating and coalescing properties. For example, the composition can contain one or more of the following: zinc stearate and other sanding aids capable of enhancing the abrasive rubbing operation; a dissolved polymer known to be useful as a stabilizer in polymer dispersions to prevent or retard agglomeration and settling of the particles; a drying oil; an oil-modified alkyd or other synthetic resin; a plasticizer (e.g. a non-volatile liquid) for component (B) or any other polymer present; flatting agents; dyes; fungicides; and drying and curing agents, and the like.

In carrying out the process of this invention, at least one layer of the novel film-forming composition is applied to at least one surface of a substrate by any suitable coating method, for example by spraying, brushing, spreading, dipping, rolling or flow-coating. When the composition is formulated to form a wiping-type color coat, before the resulting coat is dried, it is wiped with a piece of burlap or other suitable wiping means until the wiped surface has the desired appearance and the color coat remaining on the surface is present in the desired amount and location.

The wet coat of film-forming composition is subjected to drying means until the liquid phase has evaporated and the dispersed phase has undergone partial coalescence. The partially coalesced layer is "dry" although it is to be understood that there may be present residual material from the liquid phase which does not interfere with "sanding" and does not give the layer a wet feel.

The dried coat is rubbed with an abrasive to modify its smoothness. Then the resulting abraded coat is subjected to coalescing means such as solvent which substantially completely coalesces the polymeric layer.

The invention makes it possible to obtain coatings which are surprisingly easy to sand to the desired smoothness even when the composition contains little or no pigment or sanding aid. The dry coat may be rubbed with abrasives typically used such as sandpaper, steel wool or the abrasive action of a felt buffing wheel containing fine abrasive, a wire buffing wheel, or a stream of abrasive particles suspended in a liquid or gas. The abrasive rubbing action can result either in a very smooth surface, or in a surface having a regulated or predetermined degree or pattern of roughness, for example as tiny grooves, pits or scratches. Such a roughness pattern is sometimes desired in producing a finish having an interesting surface configuration or color contrast.

The operation of completing the coalescence of the abraded coat can be done by (1) heating the coat at a temperature at which the polymer fully coalesces, or (2) by bringing a solvent for polymer in contact with the coat followed by evaporation of the solvent, or (3) by applying to the abraded coat a layer of liquid film-forming composition containing a film-former and solvent for polymer such as by spraying followed by evaporation of the solvent, or by combinations of these or equivalent methods. A preferrred embodiment of method 3 comprises using the same polymer in the abraded coat as in the layer applied thereto.

The novel process and composition are beneficially useful for the application of durable and attractive clear and pigmented polymeric finishes on various substrates, for example articles made of bare and previously coated wood, metal, leather, paper, fabrics, plastics and the like. The invention makes it surprisingly easy to obtain single and multiple layer finish coats having the desired surface smoothness or texture along with good toughness, clarity and adhesion. When using the invention to manufacture unsupported polymeric films and sheets, a substrate is used which can be removed from the coalesced layer of composition.

The layer of composition can be applied to the substrate in the form of a base coat, wash coat, sealer coat, top coat or the like, or combinations of two or more such layers. In a finish containing a plurality of layers, the completion of coalescence can be carried out on each layer individually, or on two or more of the layers in a singel coalescing operation. In some applications a single coat can be used in place of two coats needed in a prior art method; for example after the sanded-smooth partially coalesced coat is fully coalesced, it has satisfactory appearance and toughness for some products without requiring a top coat over the sanded coat.

In the Examples which follow all parts are by weight unless otherwise indicated.

EXAMPLE 1

Steel panels (4 inches × 4 inches with a 1/4 inch hole punched in center) are sprayed with a red, steel primer and dried. The thickness of the primer on each panel is then measured with an Elcometer (Elcometer Instruments Ltd., Droylsden, Manchester, England. Available from Gardner Laboratory, Inc., Bethesda, Maryland). The primed panels are then sprayed with the solution or organosol to be tested and dried at the desired temperatures. The organosols were dried at room temperature and the solutions at 100° C. The total thickness of primer and experimental material is then measured with the Elcometer and the previously determined primer thickness subtracted to give the thickness of the experimental film.

The panels are then abraded on a Taber Abraser using S-33 sandpaper strips adhered to the outside of the two rubber wheels. Fresh sandpaper is used for each sample. Using a 250 g. load, the panels were abraded until one half of the abraded area of the experimental film was completely abraded away exposing the red primer underneath. The number of cycles required to do this was divided by the thickness of the experimental film to give the abrasion resistance in cycles/mil.

Results are shown in Table I.

TABLE I

|  | 1A | 1B | 1C | 1D | 1E |
|---|---|---|---|---|---|
| Organosol*, g | 20 | 20 | 100 | 100 | 100 |
| Cellosolve acetate, ml | 210 | 105 | 29 | 30 | 20 |
| Toluene, ml |  | 105 |  |  |  |
| Butyl Cellosolve, ml |  |  | 14 |  |  |
| Mineral spirits**, ml |  |  | 60 |  |  |
| Solvent***, ml |  |  |  | 100 | 100 |
| Type | Solution | Solution | Organosol | Organosol | Organsol |
| Thickness (mils) | 1.13 | 1.33 | 2.95 | 1.55 | 1.15 |
| Cycles | 267 | 298 | 348 | 315 | 153 |
| Cycles/mil | 236 | 224 | 118 | 203 | 133 |
| Thickness (mils) | 1.12 | 1.59 | 3.60 | 1.19 | 2.14 |
| Cycles | 261 | 304 | 411 | 250 | 183 |
| Cycles/mil | 235 | 194 | 114 | 210 | 85 |
| Average cycles/mil | 235 | 209 | 116 | 206 | 109 |
| Percent coalescence | 100 | 89 | 49 | 88 | 46 |

*55/40/5 MMA/MA/DMAM (MMA=methhl methacrylate; MA=methyl acrylate; DMAM=dimethylaminoethyl methacrylate) organosol having 54% solids.
**Mineral spirits (B.P. 145–215° C., A.P. 57° C.).
***Aliphatic hydrocarbon solvent (B.P. 143–168° C., A.P. 56° C.).

The solution (1A) was made by diluting the organosol with a cellosolve acetate which gave a clear, viscous solution. Films cast from this solution were clear, hard and tough. The 235 cycles/mil obtained is the value used corresponding to 100 percent coalescence.

The (1B) sample contains substantial amounts of toluene, a poor solvent, thus retaining some organosol character. The Taber value of 209 cycles/mil or about 89 percent of the value for the 100 percent coalesced materials substantiates the validity of the assumption.

The (1D) sample is an organosol containing 30 ml cellosolve acetate solvent. The Taber test showed 206 cycles/mil or 88 percent coalescence.

Samples (1E) and (1C) of this invention were prepared as follows: the degree of coalescence was reduced for film prepared from (1E) by reducing the amount of coalescing solvent in (1D) from 30 ml to 20 ml. The Taber test gave 109 cycles/mil or 46 percent coalescence. This material has good sanding properties.

The degree of coalescence in (1C) was obtained using a mixture of coalescing solvent (cellosolve acetate) and slow evaporating non-solvent (butyl cellosolve and mineral spirits). The Taber test gave 116 cycles/mil or 49 percent coalescence. This material is easy to sand.

EXAMPLE 2

A polymer dispersion is prepared such that the polymer component is a 55:40:5 terpolymer of methyl methacrylate, methyl acrylate and dimethylaminoethyl methacrylate, and the formula of the completed sealer composition is as shown below in Formula 2.1.

Formula 2.1

|  | Parts |
|---|---|
| Polymer dispersion | 55.15 |
| Mineral spirits B.R. 145–215°C. | 23.29 |
| "Butyl cellosolve" (2-butoxyethanol) | 14.79 |
| "Cellosolve" acetate | 6.77 |

In preparing the sealer composition, a preblended mixture of the last three ingredients is gradually added with stirring to the polymer dispersion. A small amount of zinc stearate can also be added when further improvement in sanding properties is desired in some applications. The polymer dispersion is prepared by (a) providing a reaction vessel (b) adding to the vessel each of the ingredients shown in Formula 2.2 below (the seed stage), (c) stirring Formula 2.2 for one hour while heating at 78°–79° C., (d) adding an additional 5.8 parts of the initiator, (e) gradually adding over a period of 2.5 hours a preblended mixture of the ingredients shown in Formula 2.3 (the feed stage), the temperature in the vessel being kept at about 78°–80° C., (f) adding 9.7 parts of the initiator, and (g) allowing the contents of the vessel to be refluxed and stirred for one hour at about 78°–80° C. The dispersion has a solids content of about 45.4 percent, and the polymer particles have an average diameter of about 0.1 micron. The polymer has a Tg of about 53° C. Azobisisobutyronitrile is the initiator.

Formula 2.2

|  | Parts by Weight |
|---|---|
| Methyl methacrylate | 73 |
| Stabilizer | 58 |
| Hexane | 826 |
| Aliphatic hydrocarbon B.R. 138–177°C. | 463 |
| Initiator | 3.5 |

Formula 2.3

|  | Parts by Weight |
|---|---|
| Methyl methacrylate | 876 |
| Methyl acrylate | 683 |
| Dimethylaminoethyl methacrylate | 85 |
| Stabilizer | 340 |

The stabilizer used is prepared as follows:
The stabilizer ingredient is a 33 percent solution of a dipersion stabilizer made by a process which comprises first making a precursor by reacting poly(12-hydroxy stearic acid), molecular weight about 1500, with glycidyl methacrylate; and then copolymerizing the resulting precursor with methyl methacrylate (MM) and methacrylic acid (MAA), the MM:MAA ratio being 98:2.

More specifically, the stabilizer is prepared by (a) heating a mixture of 93.97 parts of commercial 12-hydroxy stearic acid, 5.22 parts of VM+P naphtha, 5.22 parts of mineral spirits, B.R. 145°–215° C., and 0.37 part of catalyst (isopropanol ester of orthotitanic acid) under an atmosphere of nitrogen, while removing water by azeotrope distillation and keeping the temperature below 200° C. (e.g. about 195° C.) until the theoretical volume of water for substantially complete reaction has been removed; (b) mixing 52.00 parts of the resulting poly(12-hydroxy stearic acid) solution with 5.90 parts of glycidyl methacrylate, 20.97 parts VM+P naphtha, 20.98 parts of mineral spirits, 0.10 part of cocodimethylamine made from a mixture containing coconut-oil fatty acids [about 95 percent of the amine being the tertiary amine $C_{12}H_{25}N-(CH_3)_2$ ] and 0.5 part t-butyl catechol; (c) refluxing the resulting mixture until the acid value is about zero; (d) adding gradually over a period of three hours to a refluxing mixture of 11.74 parts of ethyl acetate and 5.87 parts of butyl acetate, a mixture of 32.02 parts of the precursor solution resulting from step (c), 16.01 parts of methyl methacrylate, 0.33 part of methacrylic acid and 0.67 part of azodiisobutyronitrile; (e) refluxing the mixture for an additional two hours; and (f) adding enough VM+P naphtha so that the resulting composition contains about 33 percent of nonvolatile component.

EXAMPLE 3

A coating composition is prepared in the manner described in Example 2 except the amounts of ingredients used in making the polymer dispersion are such that the polymer component is a 57.5:40:2.5 terpolymer of methyl methacrylate, methyl acrylate and dimethylamino ethyl methacrylate.

The resulting coating composition is used in a finishing process which consists of (1) providing some wall panels and pieces of furniture made of various kinds of wood, some of which have been coated with an ordinary furniture type wash coat and filler coat, (2) sanding the wood articles provided in Step 1 with fine sandpaper, (3) spray coating each article with a pigmented wiping stain of a type commonly used by furniture manufacturers, (4) wiping the stain coat with a clean cloth to obtain the desired color and grain appearance, (5) drying the stain coat, (6) spray coating each article which was not treated with wash coat and filler with the coating composition described above to a dry film thickness of 2.5 mils, (7) drying the coat for 30 minutes at 25° C., the dried coat being partially coalesced, (8) sanding the partially coalesced coat with fine sandpaper until it appears to be perfectly smooth, (9) completing the coalescence of the sanded coat by exposing it to methylene chloride vapor at 30° C. for one minute, (10) allowing the coat to dry for 1 hour at 25° C., (11) sanding the coat lightly with No. 400 sandpaper and then rubbing it lightly with No. 0000 steel wool, and (12) applying a thin coat of furniture wax. The finish has good appearance and durability. The partially coalesced coat is sanded completely smooth with surprising ease and speed, and the layer of subsequently coalesced polymer composition is unexpectedly effective as a combination sealer and top coat.

The claims are:

1. A process which comprises applying to a surface of a substrate a dispersion consisting essentially of a continuous liquid phase free of halogen substitution and consists essentially of a mixture of an organic liquid which is a non-solvent for the polymer at a temperature below 39° C and an organic liquid which is a solvent for the polymer at a temperature below 39° C., at least part of the former having a slower evaporation rate than at least part of the latter, and a dispersed phase comprising particles of a linear polymer which polymer has a Tg between about 10° C. and 70° C., is amorphous and has at least 50 percent by weight acrylic monomer units, and is soluble in at least one common solvent at 25° C., said disperse phase being substantially insoluble in said liquid phase at 25° C., said dispersion forming a layer having between 20–60 percent coalescence when applied and dried by evaporation of volatile components in the liquid phase at about 25° C., forming therefrom a layer of the dispersed phase, rubbing the layer with an abrasive to modify its smoothness, and subjecting the resulting abraded layer to coalescing means to form a substantially completely coalesced layer.

2. A process according to claim 1 wherein the coalescing means comprises contacting said layer with a solvent and subsequently evaporating said solvent.

3. The process of claim 1 wherein the polymer present in the disperse phase has a Tg between about 40° C. and 70° C. and is at least one member of the group consisting of poly(alkyl acrylates), poly(alkyl methacrylates), interpolymers of an alkyl acrylate and an alkyl methacrylate, and interpolymers of about 50-99.9 percent by weight of units of an alkyl acrylate or an alkyl methacrylate and about 0.1–50 percent by weight of units of another ethylenically unsaturated compound selected from the group consisting of poly(vinyl acetate), polystyrene, poly(vinyl chloride), poly(vinylidene chloride).

4. The process of claim 3 wherein the dispersion also contains a pigment.

5. A process according to claim 3 wherein the coalescing means comprising contacting said layer with a solvent and subsequently evaporating said solvent.

6. A process according to claim 4 wherein the coalescing means comprising contacting said layer with a solvent and subsequently evaporating said solvent.

* * * * *